United States Patent
Kawada et al.

(10) Patent No.: US 8,134,598 B2
(45) Date of Patent: Mar. 13, 2012

(54) PICTURE QUALITY MONITORING APPARATUS

(75) Inventors: Ryoichi Kawada, Fujimino (JP); Osamu Sugimoto, Fujimino (JP); Atsushi Koike, Fujimino (JP)

(73) Assignee: KDDI Corporation, Tokyo (JP)

( * ) Notice: Subject to any disclaimer, the term of this patent is extended or adjusted under 35 U.S.C. 154(b) by 1412 days.

(21) Appl. No.: 11/712,428

(22) Filed: Mar. 1, 2007

(65) Prior Publication Data

US 2007/0206095 A1 Sep. 6, 2007

(30) Foreign Application Priority Data

Mar. 6, 2006 (JP) .................. 2006-059335

(51) Int. Cl.
*H04N 17/00* (2006.01)
*H04N 17/02* (2006.01)
*H04N 7/173* (2006.01)
(52) U.S. Cl. .................. 348/192; 348/193; 725/107
(58) Field of Classification Search .................. 348/192, 348/193
See application file for complete search history.

(56) References Cited

U.S. PATENT DOCUMENTS

| | | | |
|---|---|---|---|
| 6,239,834 B1 * | 5/2001 | Miyaji et al. .................. | 348/193 |
| 6,943,827 B2 | 9/2005 | Kawada et al. | |
| 2002/0176002 A1 * | 11/2002 | Kawada et al. ............... | 348/192 |
| 2005/0206732 A1 | 9/2005 | Kawada et al. | |

FOREIGN PATENT DOCUMENTS

| | | | |
|---|---|---|---|
| JP | 07307925 A | * | 11/1995 |
| JP | 9-68954 A | | 3/1997 |
| JP | 2003-009186 A | | 1/2003 |
| JP | 2003-087823 A | | 3/2003 |
| JP | 2005-252453 A | | 9/2005 |
| JP | 2005-341365 A | | 12/2005 |

OTHER PUBLICATIONS

Japanese Office Action dated Dec. 10, 2008 (mailing date), issued in corresponding Japanese Patent Application No. 2006-059335.
Japanese Office Action dated Mar. 4, 2009, issued in corresponding Japanese Patent Application No. 2006-059335.

* cited by examiner

*Primary Examiner* — Kristine Kincaid
*Assistant Examiner* — Omar S Parra
(74) *Attorney, Agent, or Firm* — Westerman, Hattori, Daniels & Adrian, LLP

(57) ABSTRACT

Picture having a band of 6 MHz is distributed to the set-top box (STB) 14 via the compression encoder 11, the distribution server 12, and the network 13. The low-pass filter 151 in the picture quality monitoring apparatus 15 removes high-frequency components of an inputted digital signal and inputs luminance signal, the band of which is limited to 4 MHz, into the PSNR calculator 153. The Y/C separator 152 separates a luminance signal from NTSC analog composite signal, which are sent out from the set-top box 14. The separated luminance signal has a band of 4 MHz. The PSNR calculator 153 calculates PSNR between the luminance signal from the low-pass filter 151 and the luminance signal from the Y/C separator 152.

14 Claims, 3 Drawing Sheets

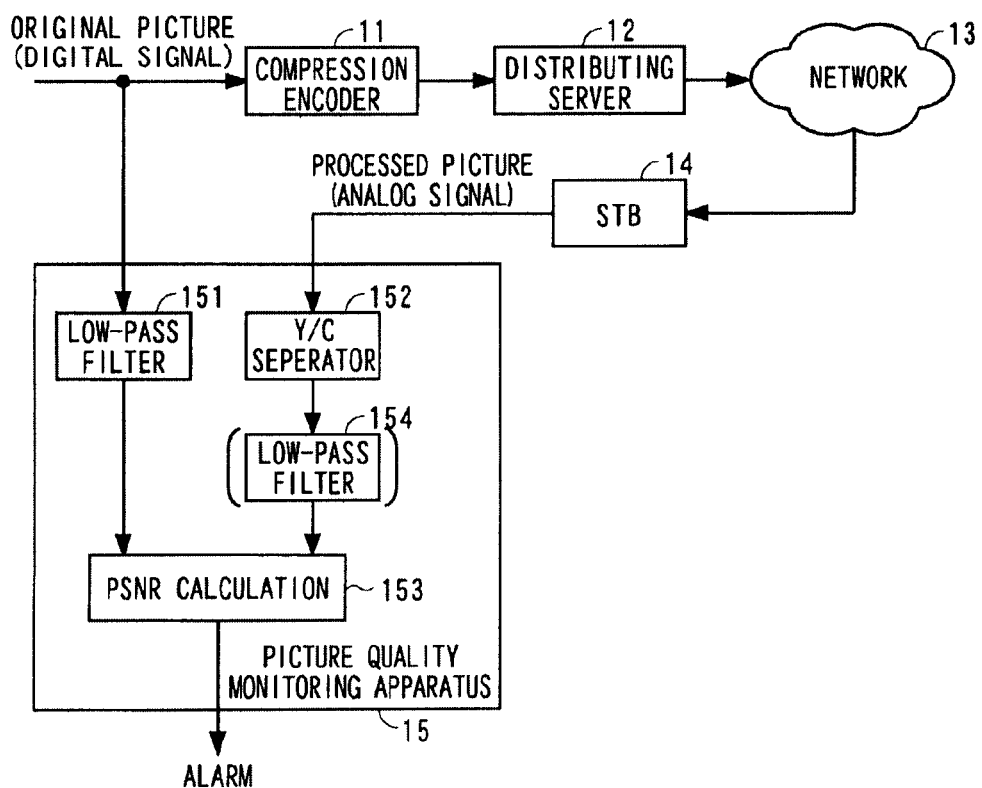
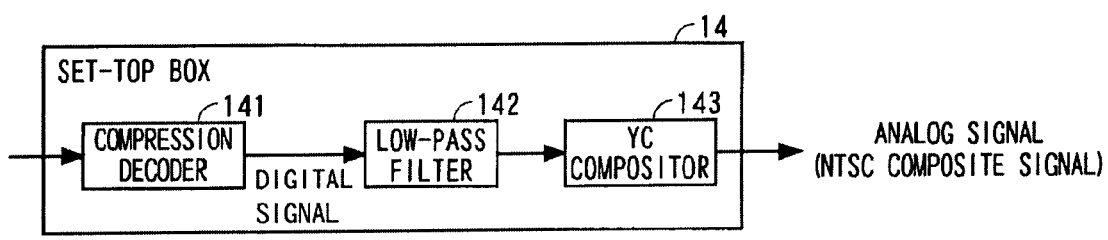

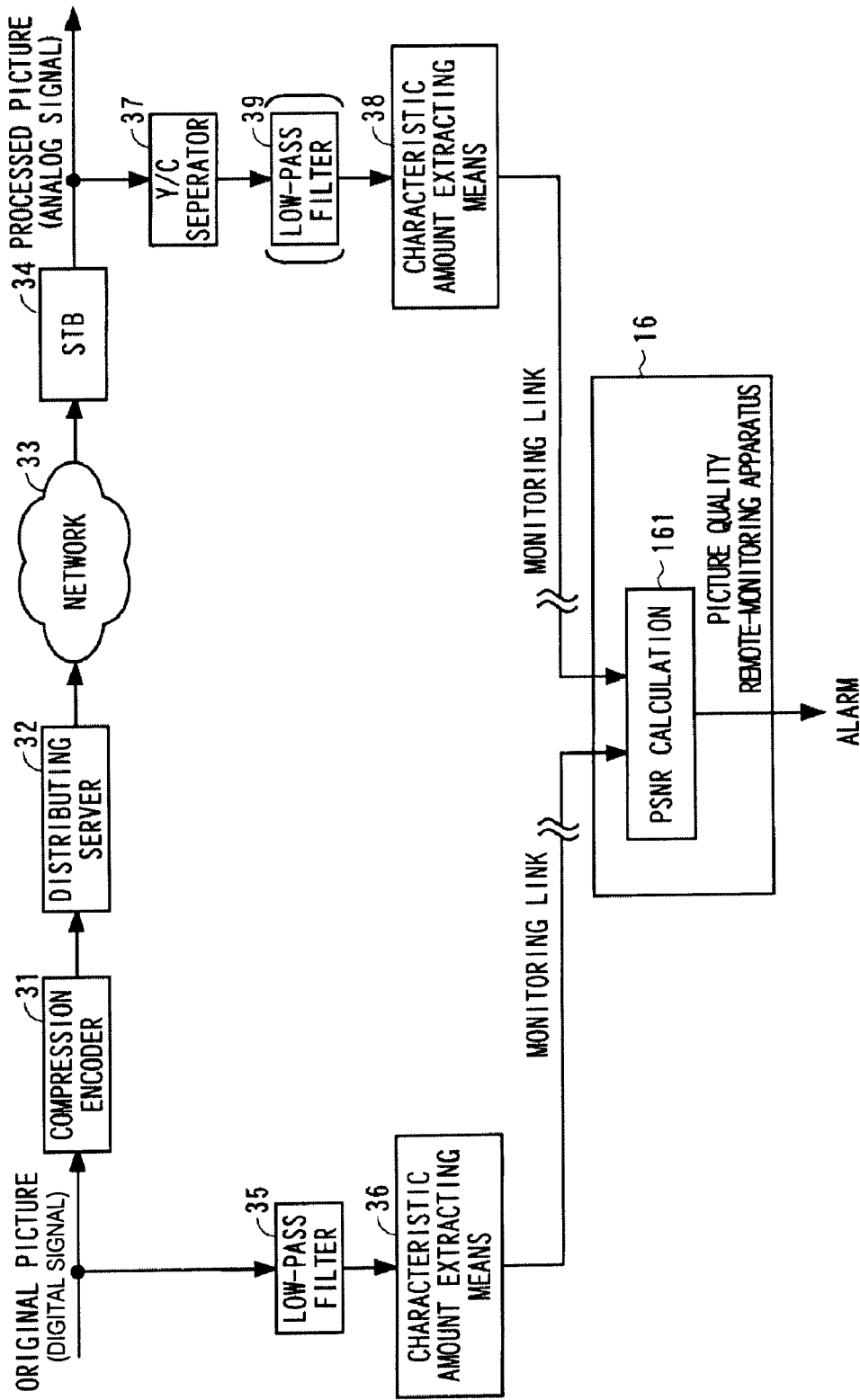

PICTURE QUALITY
CHARACTERISTIC AMOUNT

PICTURE QUALITY
CHARACTERISTIC AMOUNT

PICTURE QUALITY MONITORING APPARATUS

BACKGROUND OF THE INVENTION

1. Field of the Invention

The present invention relates to a picture quality monitoring apparatus, in particular to a picture quality monitoring apparatus that is suitable for monitoring a picture quality by comparing two pictures or for remote-monitoring a picture quality degradation collectively at a center by comparing pictures at various points on a transmission link that includes a plurality of transmission processing units in tandem.

2. Description of the Related Art

Conventionally, where a picture quality is monitored by comparing two pictures, there is a method for determining a picture quality degradation based on PSNR obtained between the corresponding pictures. For example, where a picture quality is monitored by comparing a processed picture with an original picture, the original picture and the processed picture are taken into a monitoring apparatus, and PSNR of the processed picture with respect to the original picture is obtained frame by frame. In the meantime, it is monitored whether or not PSNR decreases.

Where the video is based on NTSC, the video is composed of 30 pictures (frames) per second. Therefore, if PSNR of each frame is in an attempt to be obtained, calculation of PSNR will be carried out thirty times per second, and PSNR can be calculated by the following Equation (1).

[Equation 1]

$$PSNR = 10 \log_{10}(255^2/MSE) \quad (1)$$

Herein, MSE can be expressed by the following Equation (2) where it is assumed that b(x, y) is a signal (8 bits) of an original picture, bp(x, y) is a signal of the corresponding processed picture, and N is a total number of pixels of a picture.

[Equation 2]

$$MSE = (1/N) \sum_{(x,y)} \{b(x, y) - b_p(x, y)\}^2 \quad (2)$$

The inventors have proposed a transmitted picture quality monitoring apparatus in Patent Documents 1 and 2, which remotely monitors a picture quality degradation collectively at a center by comparing pictures at various points on a transmission link that includes a plurality of transmission processing units in tandem.

In the transmitted picture quality monitoring apparatus according to Patent Document 1, pictures extracted and picked up from two points on a transmission link are, respectively, divided into blocks, each block having a certain size, the picture of each block is orthogonally transformed, the transformed coefficient is extracted, and is transmitted to a central monitoring room as a picture quality characteristic amount. In the central monitoring room, the picture quality characteristic amounts transmitted from the two points are compared with each other to estimate PSNR. And, if PSNR is reduced, it is judged that the picture quality degradation occurs between the two points, and an alarm is issued.

In the transmitted picture quality monitoring apparatus according to Patent Document 2, the picture quality characteristic amounts are extracted by using a orthogonal transformation and PN-series multiplication, and the picture quality characteristic amounts are transmitted to a central monitoring room.

[Patent Document 1] Japanese Published Unexamined Patent Application No. 2003-87823
[Patent Document 2] Japanese Published Unexamined Patent Application No. 2003-9186

The transmitted picture quality monitoring apparatuses according to Patent Documents 1 and 2 are on the assumption that two pictures which are subject to comparison are transmitted, as they are, without varying the band in midstream. That is, if the band of two pictures, which are the objects of comparison, is the same, it is possible to determine differences between both pictures by extracting the picture quality characteristic amounts of the corresponding pictures and by comparing them.

However, there may be a case where the band of the transmitted pictures is narrowed by transmission and processing on the transmission link. In particular, where D/A conversion is included in the transmission link or D/A conversion is performed on the way of the transmission link, there are many cases where the band of the D/A-converted analog signal is further narrowed than the band of the digital signal of the original picture before D/A conversion.

For example, in a case where the original picture is based on a digital signal (a digital component signal) of D1 format, and the original picture is converted to a NTSC analog signal (an analog composite signal), with regard to the luminance signal, the band of the before-conversion digital signal is 6 MHz, and the band of the converted analog signal is 4 MHz. In detailed processing for the case where the digital signal of D1 format is converted to the NTSC analog signal, a low-pass filter is applied to the digital luminance signal having a band of 6 MHz, and the band is limited to 4 MHz, and chrominance signals having a band of 3 MHz is also limited with respect to the band. And, the band-limited luminance signal and chrominance signals are multiplexed.

In this case, the digital signal whose horizontal bandwidth is 6 MHz will be converted to the analog signal whose horizontal bandwidth is 4 MHz. Therefore, the converted analog signal is the signal whose bandwidth is considerably limited with respect to the before-conversion digital signal.

Herein, if PSNR is obtained by merely comparing the picture quality characteristic amounts of these two pictures with each other, PSNR is lowered due to influence of high-frequency component attenuation caused by the band limitation of the low-pass filter, and PSNR does not express a true picture quality degradation in a transmission link for which monitoring is required. Therefore, there remains a problem by which it is not possible to monitor the true picture quality degradation only by using the transmitted picture quality monitoring apparatuses according to Patent Documents 1 and 2 as they are.

SUMMARY OF THE INVENTION

It is an object of the present invention to provide a picture quality monitoring apparatus that is capable of solving the above-described problems and monitoring a true picture quality degradation caused by transmission and processing without being influenced due to difference in band between pictures, whose bands are different from each other, as in a digital signal and a analog signal before and after D/A conversion. In order to accomplish the object, a feature of this invention is that a picture quality monitoring apparatus for monitoring a picture quality degradation between an original picture and a processed picture whose band is limited by processing the original, comprises a horizontal low-pass filter, applied to at least the original picture, for matching the bands of the original picture and the processed picture; and a comparing means for comparing the picture qualities of the original picture and the processed picture, the bands of which are matched by the horizontal low-pass filter.

Also, a feature of this invention is that the original picture is of a digital signal and the processed picture is of an analog signal.

Also, a feature of this invention is that the original picture is of a digital component signal, and the processed picture is of an analog composite signal.

Also, a feature of this invention is that a picture quality monitoring apparatus for monitoring a picture quality degradation between pictures at two or more points on a transmission link that includes a plurality of transmission apparatus in tandem, comprises picture extracting means for extracting pictures at two or more points on a transmission link; a horizontal low-pass filter, applied to at least one picture of the pictures, for matching the bands of the respective pictures extracted by the picture extracting means;

characteristic extracting means for extracting picture quality characteristic amounts of the respective pictures whose bands are matched by the horizontal low-pass filter; and transmitting means for transmitting the picture quality characteristic amounts extracted by the characteristic amount extracting means to a central monitoring room; wherein the respective picture quality characteristic amounts are compared with each other in the central monitoring room, and the picture quality degradation of the transmitted picture is monitored.

Also, a feature of this invention is that the characteristic amount extracting means includes an orthogonal transforming means for orthogonally transforming the picture whose band is matched by the horizontal low-pass filter and an orthogonal transformed coefficients extracting means for extracting orthogonal transformed coefficient outputted from the orthogonal transforming means as the picture quality characteristic amount.

Also, a feature of this invention is that the characteristic amount extracting means includes a calculating means for applying PN-series multiplication and orthogonal transformation to the picture whose band is matched by the horizontal low-pass filter and a extracting means for extracting orthogonal transformation coefficient outputted from the calculating means as the picture quality characteristic amount.

Also, a feature of this invention is that at least one picture to which the horizontal low-pass filter is applied is of a digital signal and the other picture is of an analog signal.

Also, a feature of this invention is that at least one picture to which the horizontal low-pass filter is applied is of a digital component signal and the other picture is of an analog composite signal.

According to the present invention, frequency components attenuated with processing such as D/A conversion is attenuated from a picture before processing by applying a horizontal band-limiting filter. After that, a picture quality characteristic amount is extracted, and PSNR calculation is carried out. Therefore, influence due to difference in band between pictures can be removed, wherein it becomes possible to monitor true picture quality degradation between two pictures.

BRIEF DESCRIPTION OF THE DRAWINGS

FIG. 1 is a block diagram showing the first embodiment according to the present invention;

FIG. 2 is a block diagram showing a detailed example of a set-top box;

FIG. 3 is a block diagram showing the second embodiment according to the present invention;

DETAILED DESCRIPTION OF THE PREFERRED EMBODIMENTS

Figure 4:
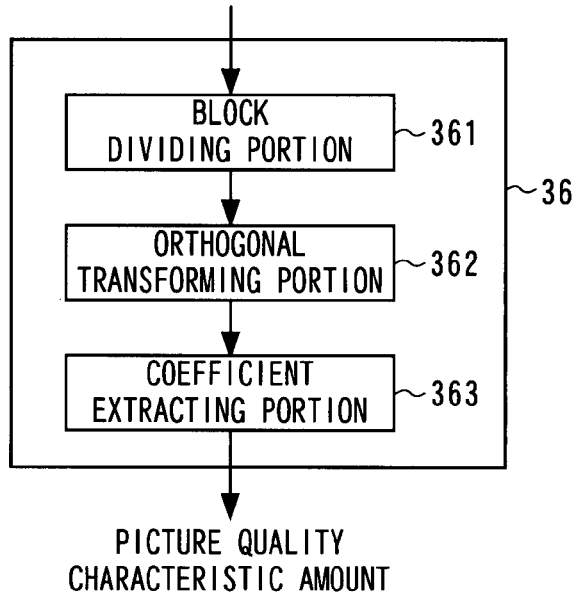
FIG. 4 is a block diagram showing a detailed example of a characteristic amount extracting means.

First, a description is given of the principle of the present invention. According to the present invention, when monitoring a picture quality degradation between pictures, the corresponding pictures at various points on a transmission link are compared with each other. For the comparison, for example, a framework of estimating a mean squared error (MSE) per pixel that constitutes pictures may be utilized.

The MSE can be expressed by the above-described Equation (2) and can be converted to PSNR by using the above-described Equation (1). In addition, it is possible to remotely estimate PSNR. Remote-estimation of PSNR is described in Patent Documents 1 and 2.

If the bands of two pictures are identical to each other where both pictures that are subject to monitoring are based on digital signals or are based on analog signals, it is possible to monitor the picture quality degradation by using the framework of PSNR calculation and remote-estimation of PSNR based on the above-described Equation (2) as they are.

However, there exists a system in which the picture before encoding for compression at the transmitting-end is digital signal, and only the band-limited analog signal is outputted from the set-top box (STB) at the receiving-end. In this system, the band of the analog signal is further narrowed than the band of the digital signal.

For example, where digital component signal of D1 format is encoded for compression and transmitted, and is converted to NTSC analog composite signal at the set-top box at the receiving-end, the luminance signal of analog composite signal outputted from the set-top box will have a band of 4 MHz while the luminance signal in the digital component signal at the transmitting-end and in the encoded digital signal to be transmitted has a band of 6 MHz. This is based on that the encoded digital signal transmitted are decoded in the interior of the set-top box, and further the band is limited by the horizontal low-pass filter for limiting the bands when generating the analog composite signal.

For this reason, PSNR obtained in the case where the digital signal at the transmitted-end and the analog signal at the receiving-end are merely compared with each other includes both a lowering in PSNR due to picture quality degradation on the transmission link and a lowering in PSNR due to influence based on the band limiting by application of a low-pass filter in the set-top box, wherein PSNR does not appropriately express the picture quality degradation on the transmission link. In particular, in the case of pictures with fine texture including a number of high-frequency components, the problem remarkably occurs.

Then, according to the present invention, low-pass filter processing is added to digital signal as pre-processing of monitoring. After that, the picture quality characteristic amounts are extracted, and PSNR is calculated. Accordingly, influence due to differences in band, which occurs with D/A conversion and so on, can be removed, it is possible to monitor an original lowering in PSNR due to picture quality degradation in the transmission link without being masked by a lowering in PSNR due to differences in band. The above description is the principle of the present invention.

Next, the embodiments according to the present invention will be described in detail with reference to the accompanying drawings. FIG. 1 is a block diagram showing the first embodiment of the present invention. Hereinafter, a description is given based on a case where a picture quality degradation between an original digital pictures of D1 format and a processed analog picture based on NTSC, which are produced by converting the original digital picture, is monitored particularly with attention paid to the luminance signals. In this case, inherently, the original picture are digital signal (digital component signal) that is divided into luminance signal Y and color-difference signals U and V, and the luminance signal Y and color-difference signals U and V have 6 MHz, 3 MHz, 3 MHz, respectively. Also, the processed picture is of an analog composite signal produced by processes including D/A conversion of the digital signal of the original picture, and the luminance signal thereof has a band of 4 MHz.

The digital signal of the original picture is encoded for compression by a compression encoder 11, and is distributed to a network 13 by a distributing server 12. The picture distributed to the network 13 is returned to the same place and received by a set-top box (STB) 14 installed at the place.

FIG. 2 is a block diagram showing a detailed example of the set-top box 14. The set-top box 14 includes a compression decoder 141 for decoding a transmitted compression-encoded digital signal, a low-pass filter 142 for removing high-frequency components of the digital signal from the compression decoder 141 and for limiting the band thereof to 4 MHz, and a YC compositor 143 for compositing YC components from the low-pass filter 142 and for producing a NTSC analog composite signal.

The luminance signal Y whose band is 6 MHz at the transmitting-end is band-limited to 4 MHz by the low-pass filter 142 when the set-top box 14 produces analog composite signal.

A picture quality monitoring apparatus 15 includes a low-pass filter 151, an Y/C separator 152, and a PSNR calculator 153. The low-pass filter 151 is a horizontal low-pass filter for limiting the high-frequency components of a picture in the horizontal scanning direction, and uses, as input, the same digital signal as those inputted into the compression encoder 11, removes the high-frequency components, and inputs the luminance signal Y, whose band is limited to 4 MHz, into the PSNR calculator 153.

The Y/C separator 152 separates respectively the luminance signal Y and color-difference signals U and V from NTSC analog composite signal, which is sent out from the set-top box 14. The separated luminance signal Y has a band of 4 MHz.

The PSNR calculator 153 uses, as input, the luminance signal Y from the low-pass filter 151 and the luminance signal Y from the Y/C separator 152, and calculates PSNR between both. Since the luminance signal Y from the low-pass filter 151 and the luminance signal Y from the Y/C separator have the same band of 4 MHz, there is no case where influence due to band-limiting by the low-pass filter 142 appears in the comparison there between. In addition, a low-pass filter 154, which is similar to the low-pass filter 151, may be provided between the Y/C separator 152 and the PSNR calculator 153, to make sure the bandwidth become the same.

When the value of PSNR becomes smaller than a predetermined threshold value, the PSNR calculator 153 regards the picture quality degradation as being large in the transmission link passing through the compression encoder 11, the distributing server 12, the network 13 and the set-top box 14, and issues an alarm.

FIG. 3 is a block diagram showing the second embodiment according to the present invention. In order to enable a picture quality remote-monitoring, the present embodiment extracts a picture quality characteristic amount from a picture that is subject to monitoring, and transmits the picture quality characteristic amount to a picture quality remote-monitoring apparatus (Central Monitoring Room) 16 via a monitoring link.

A digital signal of an original picture is encoded for compression by a compression encoder 31, and is distributed to a network 33 by a distributing server 32. The picture distributed to the network 33 is received by a set-top box (STB) 34.

The set-top box 34 has the same structure as that in FIG. 2, and decodes the transmitted compression-encoded digital signal, removes the high-frequency components of the decoded digital signal, limits the band thereof to 4 MHz, and produces NTSC analog composite signal from the band-limited digital signal.

The low-pass filter 35 is a horizontal low-pass filter for limiting the high-frequency components of a picture in the horizontal scanning direction, and uses, as input, the same digital signal as those inputted into the compression encoder 31, removes the high-frequency components thereof, and inputs luminance signal Y, whose band is limited to 4 MHz, into the characteristic amount extracting means 36.

The Y/C separator 37 separates respectively the luminance signal Y and the color-difference signals U and V from the NTSC analog composite signal, which are outputted from the set-top box 34, and inputs the luminance signal Y having a band of 4 MHz into the characteristic amount extracting means 38. Also, a low-pass filter 39 that is similar to the low-pass filter 35 may be provided between the Y/C separator 37 and the characteristic amount extracting means 38, to make sure the bandwidth become the same.

The characteristic amount extracting means 36 and 38, respectively, extract picture quality characteristic amounts which express the characteristics of picture quality, from inputted luminance signals Y. The picture quality characteristic amount may be of any type that expresses the picture quality. Those that are similar to the picture quality characteristic amounts described in Patent Documents 1 and 2 may be employed.

Figure 5:
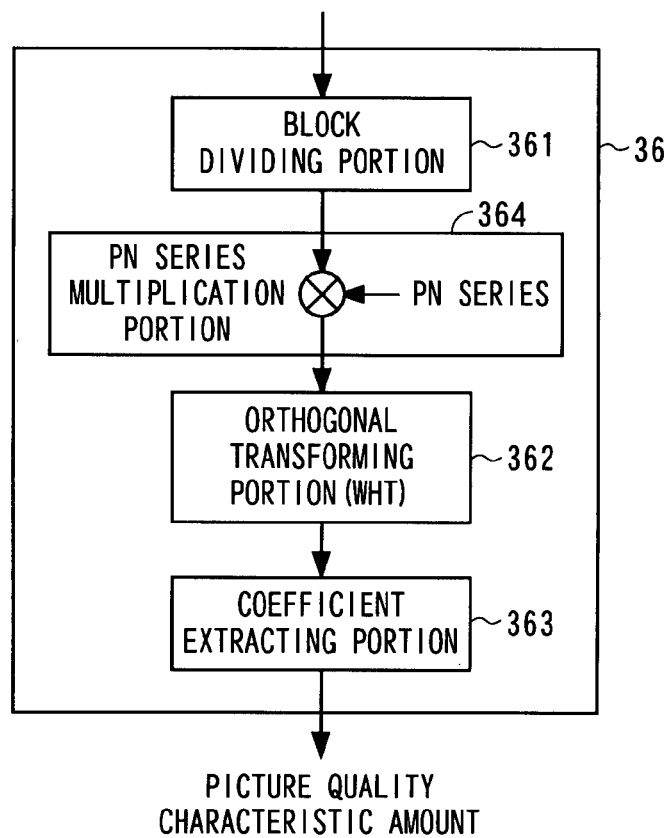
FIG. 5 is a block diagram showing another example of the characteristic amount extracting means.

FIG. 4 is a block diagram showing a detailed example of the characteristic amount extracting means 36 and 38. FIG. 5 is a block diagram showing another detailed example of the characteristic amount extracting means 36 and 38. Since the characteristic amount extracting means 36 is the same as the characteristic amount extracting means 38, a description is given only of the characteristic amount extracting means 36 hereinafter.

The characteristic amount extracting means 36 of FIG. 4 includes a block dividing portion 361, an orthogonal transforming portion 362, and a coefficient extracting portion 363. The block dividing portion 361 divides an inputted picture luminance signal Y into blocks of a predetermined size. The orthogonal transforming portion 362 orthogonally transforms the picture in the respective divided blocks.

Herein, it is preferable that spectrum spreading is carried out before the orthogonal transformation. By applying the spectrum spreading, noise on the picture is uniformly spread on a frequency area, wherein the picture quality characteristic amount can be accurately extracted. As a result, it is possible to improve the estimation accuracy of PSNR. Walsh-Hadamard transformation, Fourier transformation, and discrete cosine transformation, etc., may be employed as the orthogonal transformation.

The coefficient extracting portion 363 extracts an appropriate coefficient from the coefficients obtained by the orthogonal transformation and sends it out as the picture quality characteristic amount.

The characteristic amount extracting means 36 of FIG. 5 includes a block dividing portion 361, a PN series multiplication portion 364, an orthogonal transforming portion 362, and a coefficient-extracting portion 363. The block-dividing portion 361 divides an inputted picture luminance signal Y into blocks of a predetermined size. The PN series multiplication portion 364 multiplies PN series for the respective divided blocks. Spectral spreading is carried out by the PN series multiplication.

The orthogonal transforming portion 362 orthogonally transforms the picture in the respective divided blocks. Herein, Walsh-Hadamard transformation (WHT) is preferable as the orthogonal transformation, because WHT can achieve all calculations by sum calculation or subtraction calculation, and the calculation can be simplified. The coefficient extracting portion 363 extracts an appropriate coefficient from the coefficients obtained by the orthogonal transformation, and sends it out as the picture quality characteristic amount.

The picture quality characteristic amounts extracted by the characteristic amount extracting means 36 and 38 are, respectively, transmitted to a PSNR calculator 161 provided in the picture quality remote-monitoring apparatus (Central Monitoring Room) 16 via a monitoring link. The PSNR calculator 161 calculates PSNR based on the transmitted picture quality characteristic amounts.

As described above, a description was given of the embodiments. However, the present invention is not limited to the above-described embodiments. For example, in the embodiments, the original picture is based on a digital component signal of D1 format, and the processed picture is NTSC analog composite signal. However, the present invention may be applicable to a case where the original picture is based on a digital signal and the processed image is based on an analog signal of a narrow band and further a case where picture quality degradation is monitored between the original picture and the processed picture whose band is limited by processing.

In addition, in the above-described embodiments, the luminance signal Y and the picture quality characteristic amount extracted from the luminance signal Y are used in order to monitor the picture quality degradation. However, color-difference signals U and V may be used instead of the luminance signal Y or in addition thereto. Further, it may be devised that picture quality degradation is judged in a plurality of frames and an alarm can be issued.

What is claimed is:

1. A picture quality monitoring apparatus for monitoring a picture quality degradation between an original picture and a processed picture whose band is limited by processing the original, comprising:
   a first horizontal low-pass filter, applied to at least the original picture, for matching the bands of the original picture and the processed picture; and
   a comparing means for comparing the picture qualities of the original picture and the processed picture, the bands of which are matched by the first horizontal low-pass filter,
   wherein the original picture is of a digital signal and the processed picture is of an analog signal.

2. The picture quality monitoring apparatus according to claim 1, wherein the original picture is of a digital component signal, and the processed picture is of an analog composite signal.

3. The picture quality monitoring apparatus according to claim 1, further comprising:
   a Y/C separator which is configured to receive an analog signal.

4. The picture quality monitoring apparatus according to claim 3, further comprising:
   a second low-pass filter which is connected to said Y/C separator.

5. The picture quality monitoring apparatus according to claim 4, wherein said comparing means performs a peak-signal-to-noise-ratio calculation.

6. The picture quality monitoring apparatus according to claim 5, wherein said first low-pass filter and said second low-pass filter each provide an input to said comparing means.

7. The picture quality monitoring apparatus according to claim 3, further comprising:
   a second low-pass filter which is connected to said Y/C separator.

8. The picture quality monitoring apparatus according to claim 1, wherein said first horizontal low-pass filter is configured to receive a digital signal.

9. A picture quality monitoring apparatus for monitoring a picture quality degradation between pictures at two or more points on a transmission link that includes a plurality of transmission apparatus in tandem, comprising:
   picture extracting means for extracting pictures at two or more points on a transmission link;
   a first horizontal low-pass filter, applied to at least one picture of the pictures, for matching the bands of the respective pictures extracted by the picture extracting means;
   characteristic extracting means for extracting picture quality characteristic amounts of the respective pictures whose bands are matched by the first horizontal low-pass filter; and
   transmitting means for transmitting the picture quality characteristic amounts extracted by the characteristic amount extracting means to a central monitoring room;
   wherein the respective picture quality characteristic amounts are compared with each other in the central monitoring room, and the picture quality degradation of the transmitted picture is monitored, and
   wherein at least one picture to which the first horizontal low-pass filter is applied is of a digital signal and the other picture is of an analog signal.

10. The picture quality monitoring apparatus according to claim 9, wherein the characteristic amount extracting means includes an orthogonal transforming means for orthogonally transforming the picture whose band is matched by the first horizontal low-pass filter and an orthogonal transformed coefficients extracting means for extracting orthogonal transformed coefficient outputted from the orthogonal transforming means as the picture quality characteristic amount.

11. The picture quality monitoring apparatus according to claim 9, wherein the characteristic amount extracting means includes a calculating means for applying PN-series multiplication and orthogonal transformation to the picture whose band is matched by the first horizontal low-pass filter and a extracting means for extracting orthogonal transformation coefficient outputted from the calculating means as the picture quality characteristic amount.

12. The picture quality monitoring apparatus according to claim 9, wherein at least one picture to which the first horizontal low-pass filter is applied is of a digital component signal and the other picture is of an analog composite signal.

13. The picture quality monitoring apparatus according to claim 9, further comprising:
   a Y/C separator which is configured to receive an analog signal.

14. The picture quality monitoring apparatus according to claim 9, wherein said first horizontal low-pass filter is configured to receive a digital signal.

* * * * *